United States Patent
Schneider

(10) Patent No.: US 8,477,662 B2
(45) Date of Patent: Jul. 2, 2013

(54) COURT VIDEO TELECONFERENCING SYSTEM AND METHOD

(75) Inventor: Roland Schneider, Los Angeles, CA (US)

(73) Assignee: Vidcom Corporation, Torrance, CA (US)

(*) Notice: Subject to any disclaimer, the term of this patent is extended or adjusted under 35 U.S.C. 154(b) by 1670 days.

(21) Appl. No.: 11/789,685

(22) Filed: Apr. 25, 2007

(65) Prior Publication Data

US 2007/0285506 A1 Dec. 13, 2007

Related U.S. Application Data

(60) Provisional application No. 60/795,692, filed on Apr. 28, 2006.

(51) Int. Cl.
*H04L 12/16* (2006.01)

(52) U.S. Cl.
USPC .............. 370/261; 348/14.08; 348/14.11; 379/202.01; 201/201; 201/227; 201/228; 201/229; 715/716; 715/751

(58) Field of Classification Search
USPC .............. 348/14.01–14.16; 370/259–271, 370/351–356; 709/201–207, 217–248; 379/202.01–207.01, 265.01–266.1
See application file for complete search history.

(56) References Cited

U.S. PATENT DOCUMENTS

| | | | | |
|---|---|---|---|---|
| 5,382,972 A * | 1/1995 | Kannes | ...................... | 348/14.07 |
| 5,473,367 A * | 12/1995 | Bales et al. | ................ | 348/14.11 |
| 5,642,156 A * | 6/1997 | Saiki | .......................... | 348/14.09 |
| 5,889,945 A * | 3/1999 | Porter et al. | .................. | 709/204 |
| 5,963,246 A * | 10/1999 | Kato | .......................... | 348/14.09 |
| 6,704,769 B1 * | 3/2004 | Comstock et al. | ............ | 709/204 |
| 7,023,465 B2 * | 4/2006 | Stephens, Jr. | .............. | 348/14.09 |
| 7,061,521 B2 * | 6/2006 | Bulriss et al. | ............. | 348/14.08 |
| 7,139,015 B2 * | 11/2006 | Eshkoli et al. | ............. | 348/14.07 |
| 7,176,957 B2 * | 2/2007 | Ivashin et al. | .............. | 348/14.09 |
| 7,328,239 B1 * | 2/2008 | Berberian et al. | ............ | 709/204 |
| 7,353,251 B1 * | 4/2008 | Balakrishnan | ................ | 709/204 |
| 7,362,349 B2 * | 4/2008 | Nelson et al. | ............. | 348/14.08 |
| 8,081,205 B2 * | 12/2011 | Baird et al. | ................. | 348/14.08 |
| 2003/0174826 A1 * | 9/2003 | Hesse | ........................ | 379/210.01 |
| 2004/0236830 A1 * | 11/2004 | Nelson et al. | .................. | 709/204 |
| 2005/0078171 A1 * | 4/2005 | Firestone et al. | ........... | 348/14.08 |
| 2005/0254440 A1 * | 11/2005 | Sorrell | ........................... | 370/264 |
| 2006/0038877 A1 * | 2/2006 | Richardson et al. | ....... | 348/14.08 |

* cited by examiner

*Primary Examiner* — Hemant Patel
(74) *Attorney, Agent, or Firm* — John J. Connors; Connors & Assoc. pc.

(57) ABSTRACT

A court appearance is conducted at a scheduled date and time where at least one attorney or other participant at a remote location appears before a court by video teleconference. The court and the remote participant communicate using video and audio conferencing equipment having the capability of displaying concurrently images of the court and the remote participant during the court appearance. This enables the court and the participant to hear and see video images each other during the court appearance. The operation of the conferencing equipment is initiated and terminated at the scheduled date and time of the court appearance.

1 Claim, 10 Drawing Sheets

FIG 3A  Screen Seen By Judge With Only One Remote Attorney
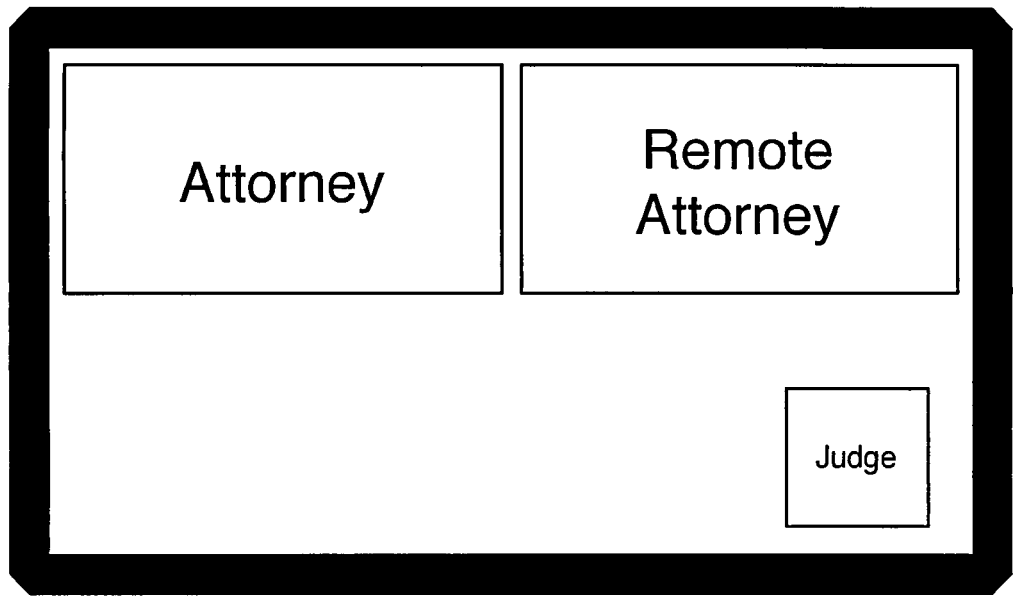
FIG 3B  Screen Seen If Only One Remote Attorney
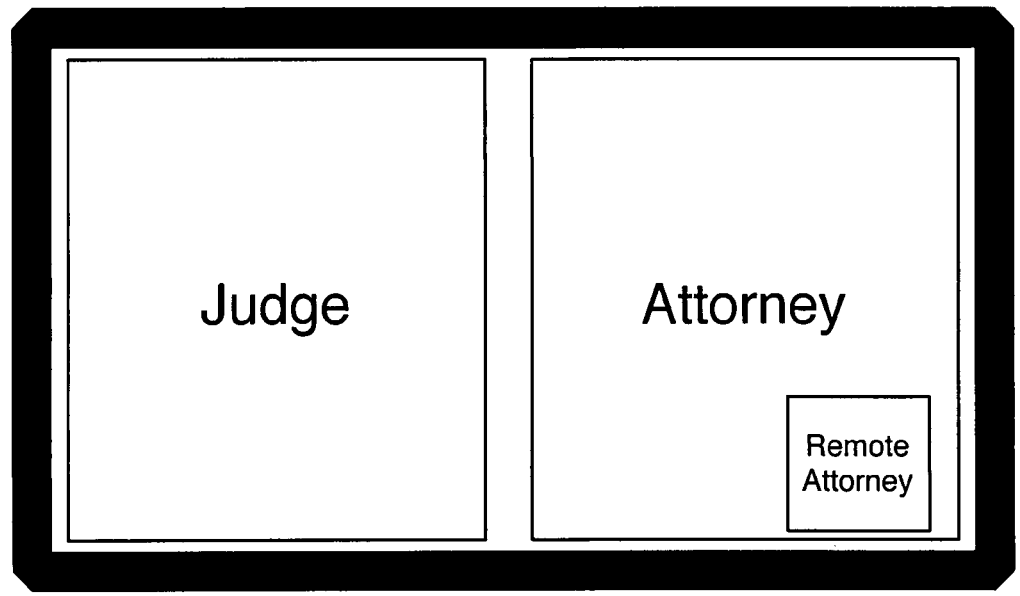

FIG 3C  Screen Seen By Remote Attorney #2
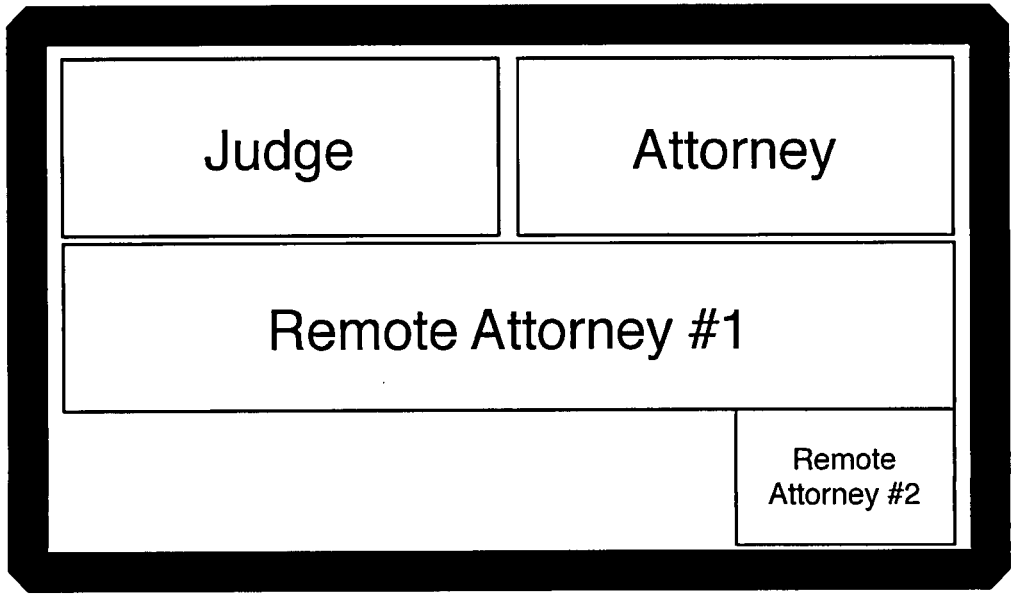
FIG 3D  Screen Seen By Remote Attorney #1
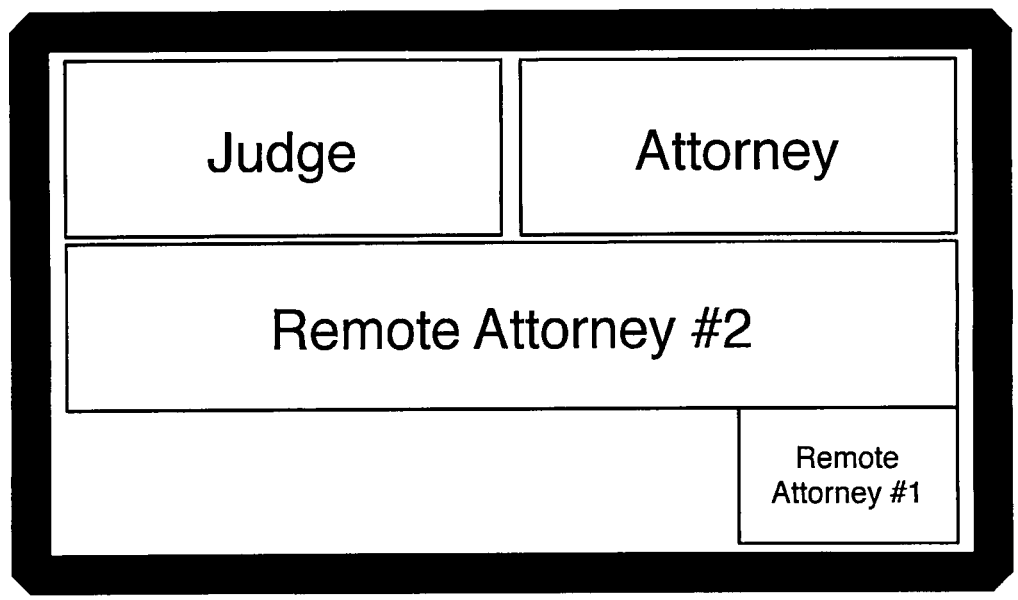

Fig. 4A

Video Court Appearance Calendar Page

| July 2006 | | | | | | |
|---|---|---|---|---|---|---|
| Sunday | Monday | Tuesday | Wednesday | Thursday | Friday | Saturday |
| 25 | 26 | 27 | 28 | 29 | 30 | 1 |
| 2 | 3 | 4 | 5 | 6 8:00am Video Court Appearance | 7 | 8 |
| 9 | 10 | 11 | 12 | 13 | 14 | 15 |
| 16 | 17 | 18 | 19 | 20 8:00am Video Court Appearance | 21 | 22 |
| 23 | 24 | 25 | 26 | 27 | 28 | 29 |
| 30 | 31 | 1 | 2 | 3 | 4 | 5 |

Fig. 4B  Court Calendar

July 6, 2006
Los Angeles Superior Court

Motions

*PARTIES AT COURT*

1. A vs B

2. C vs D

3. E vs F

4. G vs H

*VIDEO COURT APPERANCES*

5. J vs K

6. H vs I

Fig. 5    Participant Information Page

Fig. 6    Participant Template Page

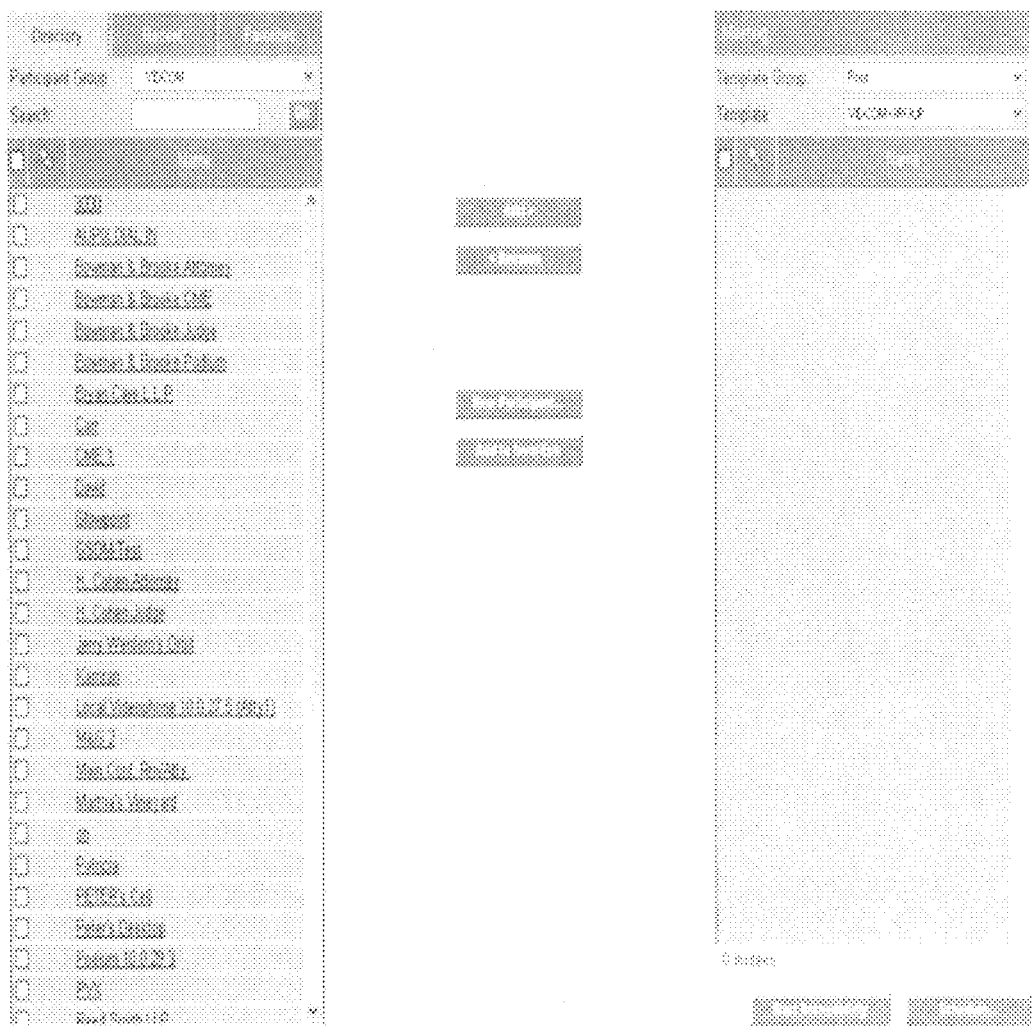
Fig. 7 Video Court Appearance Meeting Director Page

Fig. 8 Video Court Appearance Start or Schedule Page

Fig. 9    Video Court Appearance In Progress Page
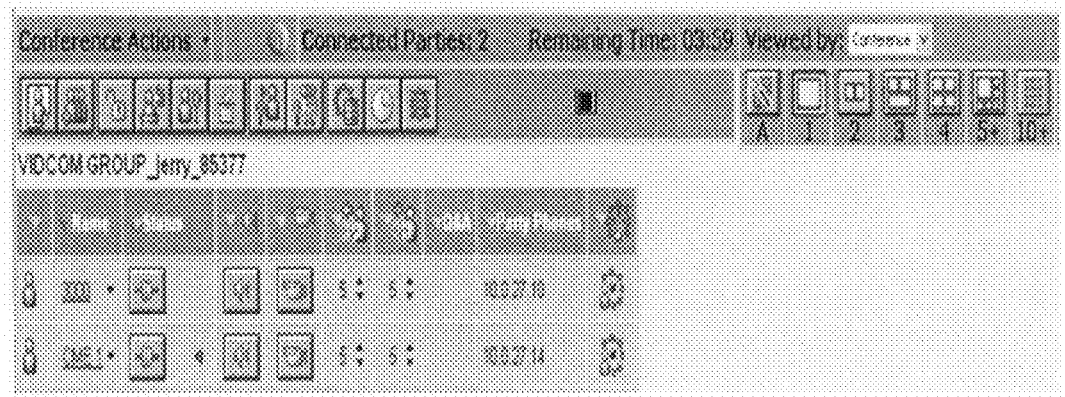
Fig. 10   Ongoing Video Court Appearance In Progress Page
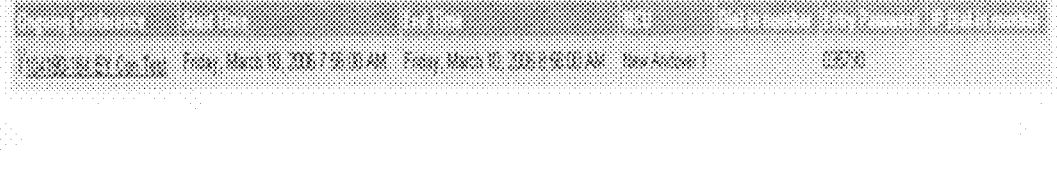

COURT VIDEO TELECONFERENCING SYSTEM AND METHOD

RELATED PATENT APPLICATIONS & INCORPORATION BY REFERENCE

This utility patent application claims the benefit under 35 USC 119(e) of U.S. Provisional Patent Application No. 60/795,692, entitled "COURT VIDEO TELECONFERENCING SYSTEM & METHOD," filed Apr. 28, 2006. This related application is incorporated herein by reference and made a part of this application. If any conflict arises between the disclosure in this utility application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

DEFINITIONS

The words:

"comprising," "having," "containing," and "including," and other forms thereof, are intended to be equivalent in meaning and be open ended in that an item or items following any one of these words is not meant to be an exhaustive listing of such item or items, or meant to be limited to only the listed item or items;

"court(s)" includes one or more authorized individuals responsible for, or who assist in, conducting administrative or judicial proceeding of a governmental branch or agency, including but not limited to, judges, magistrates, justices of the peace, administrative officers and assistants, examiners, clerks, assistant clerks, and other officials responsible for the administration of justice and implementing the law.

"private network" is a network that can only be accessed by authorized users.

"dedicated telephonic link" is a telephone connection that is an established, held open line, that is available at any moment for communication between at least two parties.

BACKGROUND

A videoconference, also known as a video teleconference, is a set of interactive telecommunication technologies that allow two or more locations to interact concurrently via multi-way video and audio transmissions. Video teleconferencing between multiple parties at different remote locations is a growing practice. It has, however, not been adopted by courts, even though telephone conferencing between a court and opposing attorneys is being used by some courts in some locations. A court video teleconferencing system would find its greatest application at motion hearings, or other conferences where an attorney, or a plurality of attorneys, is scheduled to appear before a court at a specific date and time. The court may also use this system to conduct video teleconferences with whomever the court may desire to communicate with at remote locations, including, but not limited to, prisoners, administrative assistants, other courts or representatives of other governmental branches, for example, state and federal agencies, district attorneys, police stations, county jails, etc.

SUMMARY

My system and method enables at least one attorney or other participant at a remote location to appear before a court by video teleconference.

My system and method has one or more of the features depicted in the illustrative embodiments discussed in the following section entitled "DETAILED DESCRIPTION OF SOME ILLUSTRATIVE EMBODIMENTS." The claims that follow define my invention; however, without limiting the scope of my invention as expressed by these claims, in general terms, some, but not necessarily all, of the features of my system and method are:

One, my system includes video and audio conferencing equipment at the court and at the location of each participant appearing before the court by video teleconference. Communication links place the conferencing equipment of each participant and the court in video and audio communication. These communication links may have the same or different protocols and they are connected to each other concurrently regardless of the protocols of the communication links. The court may use a private communication link to send and receive video and audio transmissions.

Two, a dedicated telephone link may be included in my system that enables the court to keep open a communication link with a conference manager. The conference manager establishes through a bridging center communication between the court and each participant appearing before the court by video teleconference. The conference manager initiates and terminates any such video teleconference appearance. This bridging center enables the conference manager to communicate with any participant appearing at a scheduled video teleconference. The bridging center receives and transmits video and audio transmissions between the court and any participant, and transcodes each protocol regardless of bit rate, frame rate, resolution rate, and video and audio compression and decompression schemes. The bridging center may include a single platform having multi-network connectivity. My system may include a controller under the control of the court that is in communication with the bridging center and enables the court to control the video images being transmitted.

Three, my system may include video and audio conferencing terminals at the location of each participant and the court. These terminals are in communication with the bridging center over the communication links. The bridging center provides a gateway allowing the terminals to send and receive concurrently digital audio and video signal streams regardless of the protocols of the communication links. The bridging center includes a computer system programmed to enable simultaneous real-time communication between the terminals. The terminals may include a device for near-real time compression and decompression of audio and video signal streams being transmitted. My system may include a private communication network comprising the court's video and audio conferencing terminal and the bridging center. This private communication network may be a high speed and high bandwidth network and may include the dedicated telephone link.

My method comprises the steps of (a) scheduling a date and time for a court video teleconference appearance, (b) providing the court and a participant in appearance with video and audio conferencing equipment capable of displaying concurrently images of the court and the participant during the appearance, thereby enabling the court and participant during the appearance to hear each other and see video images of each other, and (c) initiating and terminating the operation of the conferencing equipment at the scheduled date and time of the court appearance.

The court video teleconference appearance is initiated after confirming the availability of the court and each participant. The court and each participant have access to video conferencing terminals enabling the court and any participant to hear each other and see video images of each other. The conference manager, typically at a remote location, initiates and terminates the operation of the terminals. The conference manager may have conference observation equipment that enables him to her to observe video images of the court and participants during the court video teleconference appearance, and may be in communication with the court during the scheduled appearance over a dedicated telephone link. The court controls the video images being transmitted during the court appearance. The court's terminal may be connected by a private network with a remote bridging center that places the terminal of the court and each remote participant in video and audio communication with each other and the court concurrently over different communication links regardless of the protocol of these communication links, which may have the same or different protocols.

DESCRIPTION OF THE DRAWING

Some embodiments of my system and method, illustrating all its features, will now be discussed in detail. These embodiments depict my novel and non-obvious system and method as shown in the accompanying drawing, which is for illustrative purposes only. This drawing includes the following figures (Figs.), with like numerals indicating like parts:

FIG. 3A-3D depicts various display screen configurations as viewed by different participants of a video teleconference in progress at different times during the conference.

FIG. 4A depicts a display screen showing a monthly court calendar used by the conference manager to automatically schedule video teleconferences.

FIG. 4B depicts a display screen showing a daily court calendar of appearances.

FIG. 5 illustrates a display screen showing specific information of about an individual endpoint user.

FIG. 6 illustrates a display screen showing specific information of about previously registered endpoint users.

FIG. 7 illustrates a display screen showing entries about to be made by the conference manager as he or she establishes communication between the participants of a video telephone conference at a court appearance.

FIG. 8 illustrates a display screen as depicted in FIG. 7 showing some entries made by the conference manager.

FIG. 9 illustrates a display screen used by a conference manager showing the images on the various screens of participants attending a court appearance by video telephone conference.

FIG. 10 illustrates a display screen providing information concerning the court appearance by video telephone conference as the conference progresses.

DETAILED DESCRIPTION OF SOME ILLUSTRATIVE EMBODIMENTS

General

Although my system contemplates mainly being used by a court to schedule video teleconferences with attorneys that may be at remote locations, other remote endpoint users may also use my system to schedule a video teleconference with a court. My system enables at least one attorney, or other endpoint user, at a remote location to communicate with a court. It includes (a) video and audio conferencing equipment at the location of each remote user appearing before the court and (b) video and audio conferencing equipment at the location of the court. Private or public network communication links allow the video teleconferencing equipment of the court and each attorney appearing before the court, weather in person or remotely, to interact concurrently via multi-way video and audio transmissions. This multi-point video teleconference is established or bridged regardless of the protocols of the different communication links that a court or one or more remote endpoint user may be using. Thus, my system, establishing concurrent video and audio communication links between all conference participants, enables the court to communicate with several remote endpoint users appearing before the court at the same scheduled court video teleconference.

For example, the scheduled court video teleconference may be a motion hearing that is scheduled for a particular day and time, to be conducted in a particular courtroom (the court's proceedings may be conducted in locations other than a courtroom). In this example, there is physically located in the courtroom (1) the court's video and audio conferencing terminal, typically at the judge's bench with its display screen facing the judge, and (2) a second in-courtroom video and audio conferencing terminal spaced from the court's terminal, typically at least one attorney lectern with its display screen facing the public gallery. These in-courtroom video and audio conferencing terminals are part of a private network, for example, one using the RFC 1918 Private Internet Protocol address that enables only authorized participants to access the private network. A bridging center having multipoint network connectivity, as discussed subsequently in greater detail, affords access to the private network.

FIG. 1

Figure 1:
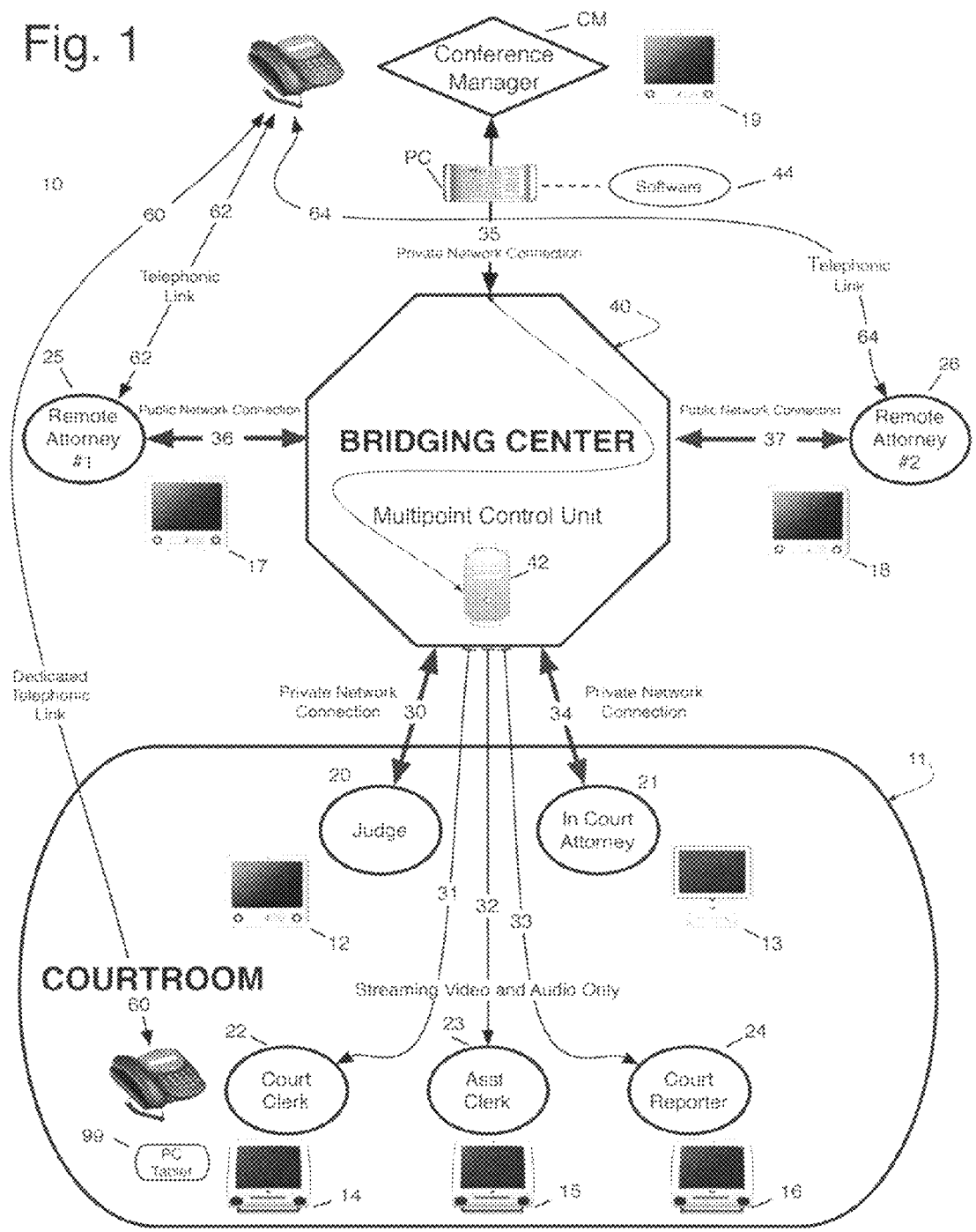
FIG. 1 is a schematic diagram illustrating one embodiment of my system and method.

Referring to FIG. 1, one embodiment of my system is designated by the numeral 10. This system 10 uses a multi-way, digital, video and audio conferencing configuration that includes (a) interactive endpoint user terminals 12, 17, 18, and 19 having at least one video display monitor, a video camera, a microphone, a speaker or speakers, and a codec device (coder/decoder) and (b) an interactive endpoint user terminal 13 having at least one video display monitor, a video camera, a microphone, and a codec device, but no speaker or speakers. The codec device is conventional hardware or software used for compression and decompression of digital video and audio signals being transmitted in near real time over a private network including private connections or links 30, 31, 32, 33, 34, and 35 or public network connections or links 36 and 37.

Both terminals 12 and 13 are physically located in the courtroom 11. Also physically located in the courtroom 11 are non-interactive terminals 14, 15, and 16 used by in-courtroom personnel to monitor what is occurring. The terminals 12, 13, 14, 15, and 16 in the courtroom 11 enable all in-court endpoint users 20, 21, 22, 23, and 24 to hear and see the proceedings, but only the judge, endpoint user 20, and the in-court attorney, endpoint user 21, may concurrently participate with the remote endpoint users, the remote attorneys endpoint users 25 and 26, and the conference manager, endpoint user CM. All the terminals 12, 13, 14, 15, 16, 17, 18, and 19 may be purchased from Vidcomgroup, Inc. of Santa Monica, Calif. under the trademark Polycom™

Different terminal functionality is desirable. The terminal 12 is at the judge's bench with its display screen facing the judge 20, and the terminal 13 is at an in-court attorney lectern with its display screen facing the public gallery (not shown).

Speaker or speakers are not required for the in-court attorney terminal 13, because any participant at the appearance who is in the courtroom 11 will hear the judge or other in-courtroom participant. These endpoint user terminals 12 and 13 need not be of the same make or model and may not even have the same exact features. For example, the in-court attorney 21 utilizing the terminal 13 would only need a video display monitor to see any remote endpoint users, a video camera so as to be seen by any endpoint users, a microphone so as to be heard by any endpoint users, and a codec device for the compression and decompression of the video teleconference transmission. The terminal 13 would not require a speaker, as it would most likely cause unnecessary latency, echo, and possible audio feedback in the courtroom 11. The other in-court video and audio terminals 14, 15, and 16 may be located at the stations of, for example, the court clerk 22, assistant court clerk 23, and court reporter 24. Such court personnel would see and hear the in-court proceeding and would hear the out-of-court remote attorney's 25 and 26 over the judge's 20 terminal 12. Consequently, the terminals 14, 15, 16 only utilize a video display monitor and a codec device. Since such court personnel do not normally engage directly with the in-court attorney 21 or the remote endpoint users 25 and 26 participating in the court appearance, the terminals 14, 15, and 16 would not include a camera, a microphone, or a speaker.

The video teleconference is established by an out-of-courtroom conference manager CM via a bridging center 40. The conference manager CM may be at a remote location away from the bridging center 40, for example, in another city, and uses an endpoint user terminal 19 and a personal computer PC with video teleconferencing software 44 to interact with a multipoint control unit 42 at the bridging center 40. Polycom™ MGC Web Commander™, which may be purchased from Vidcomgroup, Inc. of Santa Monica, Calif., is a browser-based software application for monitoring, managing and scheduling video teleconferences. The conference manager CM has control over all aspects of setting up and running conferences using a standard web browser. The conference manager CM establishes, monitors, and maintains the communication with the various remote endpoint users terminals 12, 13, 14, 15, 16, 17, and 18 as required to achieve a legally valid appearance by all participants. The multipoint control unit 42 interconnects video teleconference calls from multiple sources simultaneously allowing video teleconferencing of two or more remote points possible. There are various multipoint control units 42 that may be pure software or stand-alone hardware devices, or are a combination of hardware and software devices, or are embedded into endpoint user terminals. The conference manager CM interacts with the multipoint control unit 42 through the use of the personal computer PC equipped with video teleconferencing software 44 to establish a connection with all the endpoint user terminals 12, 13, 14, 15, 16, 17, 18, and 19.

The bridging center 40 employs conventional video teleconferencing bridging equipment that recognizes private network connections 30, 31, 32, 33, 34, and 35 and non-private network connections 36 and 37. This bridging equipment enables all the participants 20, 21, 22, 23, 24, 25, 26, and CM to communicate concurrently at a scheduled court appearance via different communication links operating with different protocols. For example, both the private network connections 30, 31, 32, 33, 34 and 35 and the non-private network connections 36 and 37 may use, for example, such protocols as: ISDN (Integrated Services Digital Network) such as H.320, or DS1 (Digital signal 1, also known as a T1), or a DSL (Digital Subscriber Line) such as H.323 network connections in conjunction with IP (Internet Protocol) or SIP (Session Initiation Protocol). This capability is called transcoding. Suitable bridging equipment that enables transcoding may include a multipoint control unit 42, such as, for example, the Polycom™ MGC-25, MGC-50, or MGC-100, that may be purchased from Vidcomgroup, Inc. of Santa Monica, Calif.

The bridging center 40, through transcoding software and/or hardware responsive to the direction of the conference manager CM, enables the conference manager to establish concurrently communication between dissimilar video teleconferencing technologies, for example, connecting video teleconferencing terminals with different network communication links, namely, each having protocols with different bit rates, frame rates, resolution rates, and codec devices. Individual communication links 30 and 34 are in place between the in-courtroom terminals 12 and 13 and the bridging center 40, and the communication links 31, 32, and 33 are in place between the in-courtroom terminals 14, 15, and 16 and the bridging center 40. Individual communication links 36 and 37 are in place between the remote endpoint user terminals 17 and 18 and the bridging center 40. This allows the judge's 20 video teleconferencing terminal 12, the in-court attorney terminal 13, and the court personnel terminals 14, 15, and 16 and the remote endpoint user terminals 17, 18, and 19 all to communicate concurrently via the bridging center 40 over a private network established by the conference manager CM when he or she connects the authorized participants. Any of the communication links 30, 31, 32, 33, 34, 36, or 37 may be public network connections such as, for example, the world wide web public internet and may utilize any network transport service employing the same or different protocols.

A dedicated telephonic link 60 is established between the conference manager CM and the judge 20 or the court clerk. This is useful, firstly, for establishing and opening a communication link between the conference manager CM and court personnel prior to a court appearance. Once the in-courtroom video teleconference terminals 12, 13, 14, 15, and 16 are powered on and multi-way communication between all the participants is established by the conference manager CM, the dedicated telephonic connection 60 is maintained and held open. This useful feature allows for the court 20 or the conference manager CM to communicate immediately with one another and resolve any unforeseen technical or other difficulties should they arise.

A telephonic connection via public telephone lines 62 and 64 may established between the conference manager CM and the remote attorney 25 and 26. This is useful for establishing a communication link between the conference manager CM and the remote attorney prior to a court appearance is to start. Once the remote attorney's video teleconference terminal is powered on and a multi-way communication is established between the conference manager CM, the telephonic connection 62 or 64 need not stay open, can be used momentarily if necessary. Another useful feature of this telephonic connection 62 and 64 is for a remote attorney 25, 26 or the conference manager CM to re-establish contact with one another and resolve any unforeseen technical or other difficulties should they arise.

Someone, normally a person other than the conference manager CM, schedules the court appearance. The conference manager CM is notified who intends to participate remotely in any scheduled court appearance using the system 10. The conference manager CM is then responsible for the establishment, monitoring, and maintaining of multiple communication links between the court 20 and various in-court and remote participants in the scheduled appearance as discussed as follows in connection with FIG. 3A et seq.

Optionally, a PC tablet 99 may be used by the court 20 or the court clerk 22 at the direction of the court to control the video teleconference while it is in progress. The PC tablet 99 would be operably connected in the system 10, for example, to enable the court or clerk to interrupt the video teleconference immediately at any time during its progress.

FIG. 2

Figure 2:
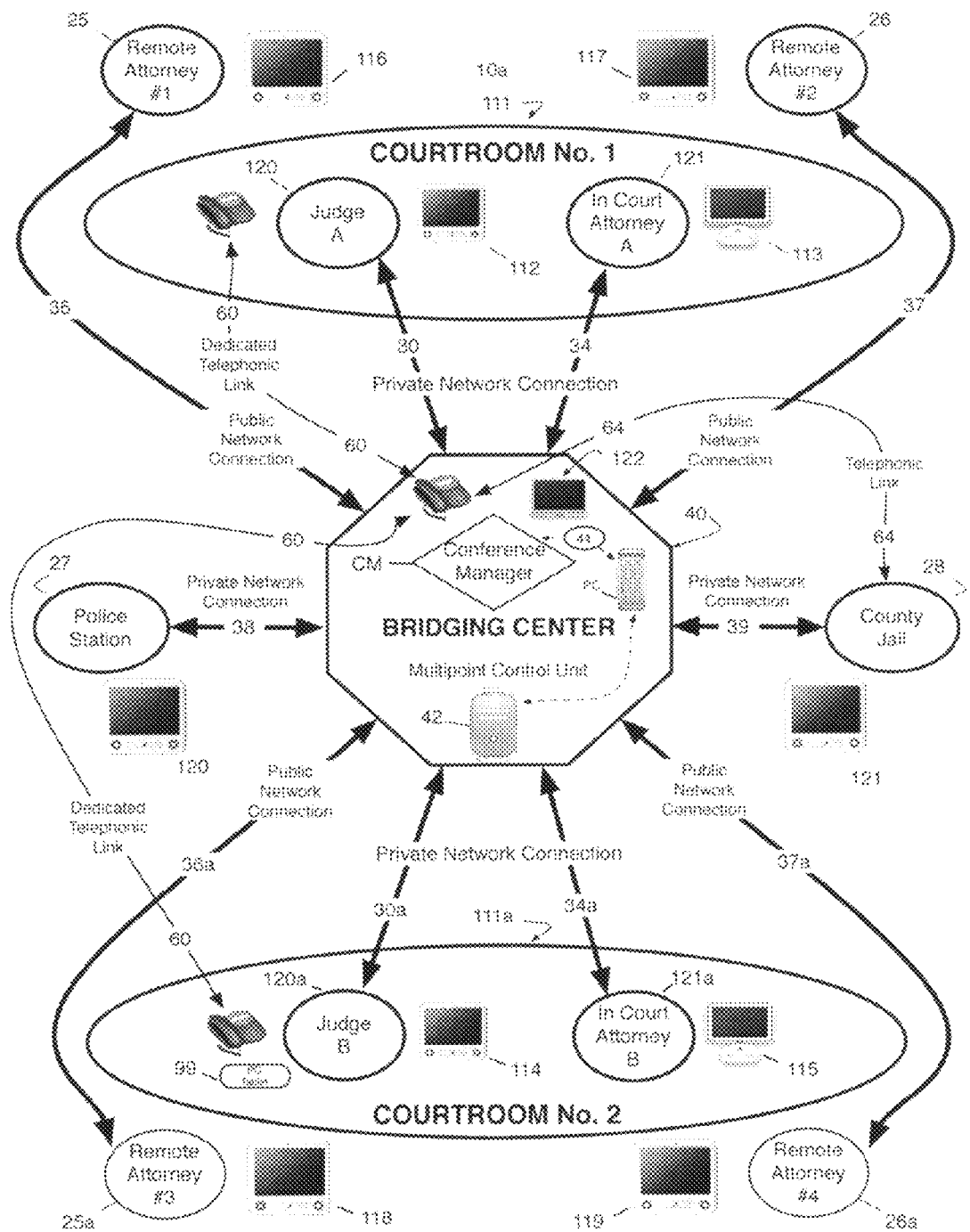
FIG. 2 is a schematic diagram illustrating another embodiment of my system and method.

Referring to FIG. 2, another embodiment of my system is designated by the numeral 10*a*. A multi-way video teleconferencing system is used that includes endpoint user terminals 112, 113, 114, 115, 116, 117, 118, 119, 120, and 121 located at various locations and allows, for example, multiple courtrooms 111, 111*a*, remote attorneys 25, 26, police stations 27, and jail facilities 28 to participate and communicate concurrently in one large group conference or multiple aggregates there of. The various locations are linked together in a private network regardless of the protocols of individual communication links being used by the various participants. One conference manager CM may control the operation of more than one court at the same time.

A multiple court appearance, or simultaneous multiple court appearances, are conducted by an out-of-courtroom conference manager CM who may be at the location of a bridging center 40 and may use an endpoint user terminal 122 and a personal computer PC with video teleconferencing software 44 to interact with a multipoint control unit 42 simultaneously interconnecting video teleconference calls that may use multiple network protocols and establish, monitor, and maintain a multiple court appearance or simultaneous multiple court appearances with the various remote endpoint users terminals 112, 113, 114, 115, 116, 117, 118, 119, 120. If a courtroom 111 wants to establish a court appearance with another courtroom 111*a*, remote attorney 25, 25*a*, 26, 26*a*, police station 27, or jail 28 a scheduled start may be programmed by the conference manager CM through the use of a personal computer PC with video teleconferencing software 44 to interact with a multipoint control unit 42.

At the in-courtroom terminals 112, 113, 114, 115 individual communication links are established allowing the judge's 120, 120*a* video teleconferencing terminal 112, 114 the in-court attorney video teleconferencing terminals 113 and 115 to communicate with the bridging center 40 on a private network. The remote user's terminals 116, 117, 118, 119 communicate with the other terminals in the private network via the bridging center 40. The conference manager CM is able, through the use of the bridging center 40, interconnect any-and-all variations of communication links these various multiple participants may be utilizing.

FIGS. 3A-3D and 4 Through 10

The conference manager CM is responsible for monitoring and implementing all court appearances. Upon receipt of a list (FIG. 4B) of confirmed appearance participants from a scheduler, the conference manager CM will input the individual attorney names and pertinent contact information, such as telephone number and IP addresses, into the memory of the computer PC operated by WebCommander web-based software used to control the appearance, for example a Motion Hearing. This information is stored in the computer's memory and may be displayed on a page as depicted in FIG. 5. This information will be available to identify prior registered individuals participating in future upcoming appearances and may be displayed on a page as depicted in FIG. 6. The conference manager will have in the WebCommander directory the name, IP address, and phone number of the video terminal for the judge 20 and the IP address for the video terminal for the lectern at which an in-court attorney 21 appears. The court clerk 22 and court reporter 24 will be able to monitor the appearance but will not be able to actively participate. These individuals will be bridged and operational in advance of the appearance. The WebCommander software even provides for automatic connection for scheduled appearances as illustrated in FIG. 4A. Once the conference manger CM enters a particular conference on the calendar shown on FIG. 4A using the WebCommander software, the video teleconference will be initialed automatically.

Before commencement of the day's hearing calendar, the conference manager CM will telephone each of the participating attorneys involved in the day's video teleconferencing over the telephone lines 62 and 64. The conference manager CM will advise the participants to be ready to participate when the judge 20 is ready. At this point, the conference manager CM will add the participating attorneys, one by one, to the list of participants and will ensure that all are bridged with the judge through the bridging center 40. If there should be problems making a video connection, the conference manager CM will dial out, audio-only, through the bridging center 40 to the attorney in question to provide for that attorney to continue to participate voice-only.

As the court appearance progresses, the conference manager CM will see on the display screen at the terminal 19 any terminal screen he elects to view of the other participants and control what is on their individual screens as illustrated in FIGS. 9 and 10. The video image of the conference manager CM is not usually displayed on any of the terminals of the other participants as the court appearance progresses. FIGS. 3A through 3D show the display screens of different in-courtroom and out-of-courtroom participants attending the appearance.

During the period allocated by the court for the hearing of the scheduled appearances on the calendar (typically from 8:30 to 10:00 a.m.), the conference manager CM will see that the following appearance endpoints are kept muted: lectern (audio muted) and conference manager (both video and audio) to preclude problems due to unwanted video or audio echo. For each courtroom involved in an appearance, 15 minutes prior to the period allotted for an individual hearing, the conference manager CM will communicate by the dedicated telephonic link 60 with the court clerk 22. This telephonic link 60 will be kept open throughout the period allocated for remote hearings with the judge 20.

The clerk 22 of each court 20 where the conference manager CM is controlling communications will notify the conference manager when the judge of that individual court is ready for each next matter. For billing purposes, the conference manager will monitor and keep a log of each attorney's remote time in front of the an individual judge 20. The close-out of each scheduled appearance will be indicated by the judge 20 or clerk 22 over the dedicated telephonic link 60. At that time, the conference manager CM will disconnect the applicable participating attorney or attorneys from the video teleconference. When all scheduled appearances have been heard, the last of allotted ports of the multipoint control unit 42 will be closed, and the clerk 22 will hang up the telephonic link 60 used for communication with the conference manager.

Conclusion

My court video conferencing system is a simple to use and convenient for a court to install and provides a reliable and private method for the court to a conduct appearance by one or more participants by video teleconference. My court video conferencing system and method (1) reduces the time a court has to spend to conduct proceedings, especially motions and hearings at which one or more attorneys or others appear, (2)

avoids travel by participants appearing before the court to the location of the court (3) eliminates the wasted time waiting at the court for participants' scheduled appearances to commence, (4) enables a court to schedule and conduct proceedings with other remote government officials and agencies, and (5) provides a simple system that is easy to install and convenient for a court and remote endpoint users to use regardless of the protocol of the communication link between the court and the remote endpoint user or users.

SCOPE OF THE INVENTION

The above presents a description of the best mode contemplated of my system and method, and of the manner and process of making and using my system and method, in such full, clear, concise, and exact terms as to enable any person skilled in the art to which my system and method pertains to make and use it. My system and method is, however, susceptible to modifications and alternate constructions from that discussed above which are fully equivalent. Consequently, it is not the intention to limit my system and method to the particular embodiments disclosed. On the contrary, the intention is to cover all modifications and alternate constructions coming within the spirit and scope of my system and method as generally expressed by the following claims, which particularly point out and distinctly claim their subject matter:

The invention claimed is:

1. A system enabling communication between at least one participant at a location remote from a court and another participant at said court or remote from said court, said system comprising first video and audio conferencing equipment including terminals at the locations of the participants, second video and audio conferencing equipment including a plurality of terminals at the court, a first terminal at the judge's bench with a display screen facing the judge, a second terminal spaced from the court's terminal for one attorney with a display screen facing the public gallery, a third terminal at a station for a court clerk, and a forth terminal at a station for a court reporter, a private transmission system for placing said conferencing equipment of the court and first and second participants in video and audio communication with each other concurrently, and displaying images of the participants at the first, second, third and forth terminals, said terminals being placed in communication with each other by communication links having the same or different protocols, a bridging center operably connected to the transmission system and under the control of a remote conference manager that enables said conference manager to initiate and terminate a scheduled court video teleconference and who establishes communication between the court and each participant appearing before the court by video teleconference, said bridging center enabling the conference manager to communicate with the court and each participant at a scheduled video teleconference appearance and including a computer system programmed to enable simultaneous real-time communication between said terminals, and each said terminal including a device for near-real time compression and decompression of the audio and video signal streams transmitted or received thereby, said bridging center transcodes each protocol regardless of bit rate, frame rate, resolution rate, and video and audio compression and decompression schemes, and a dedicated telephone link in active communication with the court that enables the conference manager and court to communicate during a scheduled court video teleconference.

* * * * *